United States Patent
Nitzpon et al.

(10) Patent No.: US 8,169,095 B2
(45) Date of Patent: May 1, 2012

(54) WIND ENERGY PLANT WITH A ROTOR

(75) Inventors: Joachim Nitzpon, Hamburg (DE);
Matthias Zähr, Norderstedt (DE);
Viktor Nickel, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 569 days.

(21) Appl. No.: 12/277,725

(22) Filed: Nov. 25, 2008

(65) Prior Publication Data
US 2010/0026005 A1   Feb. 4, 2010

(30) Foreign Application Priority Data

Aug. 2, 2008   (DE) .................. 10 2008 036 217

(51) Int. Cl.
*F03D 9/00* (2006.01)
(52) U.S. Cl. .......................................... 290/44; 290/55
(58) Field of Classification Search .............. 290/44, 290/55
See application file for complete search history.

(56) References Cited

U.S. PATENT DOCUMENTS

| | | | | |
|---|---|---|---|---|
| 4,565,929 A | * | 1/1986 | Baskin et al. | 290/44 |
| 2003/0227174 A1 | * | 12/2003 | Bayly | 290/55 |
| 2004/0202393 A1 | * | 10/2004 | Masui et al. | 384/495 |
| 2006/0071575 A1 | * | 4/2006 | Jansen et al. | 310/266 |
| 2006/0153675 A1 | * | 7/2006 | Rogall et al. | 415/170.1 |

FOREIGN PATENT DOCUMENTS

| | | |
|---|---|---|
| DE | 102 31 948 A1 | 1/2004 |
| WO | 2007085644 A1 | 8/2007 |

OTHER PUBLICATIONS

Grote/Feldhusen: Dubbel, Taschenbuch fur Maschinenebau, Spring 2007, S. 680, 681 ISBN 978-3, 540-49714-1 (Grote/Feldhusen: Dubbel, Handbook of Mechanical Engineering, Spring 1994, ISBN 3540198687).

\* cited by examiner

*Primary Examiner* — Quyen Leung
*Assistant Examiner* — Naishadh Desai
(74) *Attorney, Agent, or Firm* — Vidas, Arrett & Steinkraus, P.A.

(57) ABSTRACT

A wind energy plant with a rotor, which is connected to a gearbox and/or a generator via a rotor shaft, wherein the rotor shaft is bearing mounted on a carrier unit via two taper roller bearings in an O arrangement, characterized in that each taper roller bearing has an inner and an outer race, wherein the inner races and the outer races are secured in their distance to each other in the axial direction with respect to the rotational axis of the rotor shaft via an adjustment device.

20 Claims, 5 Drawing Sheets

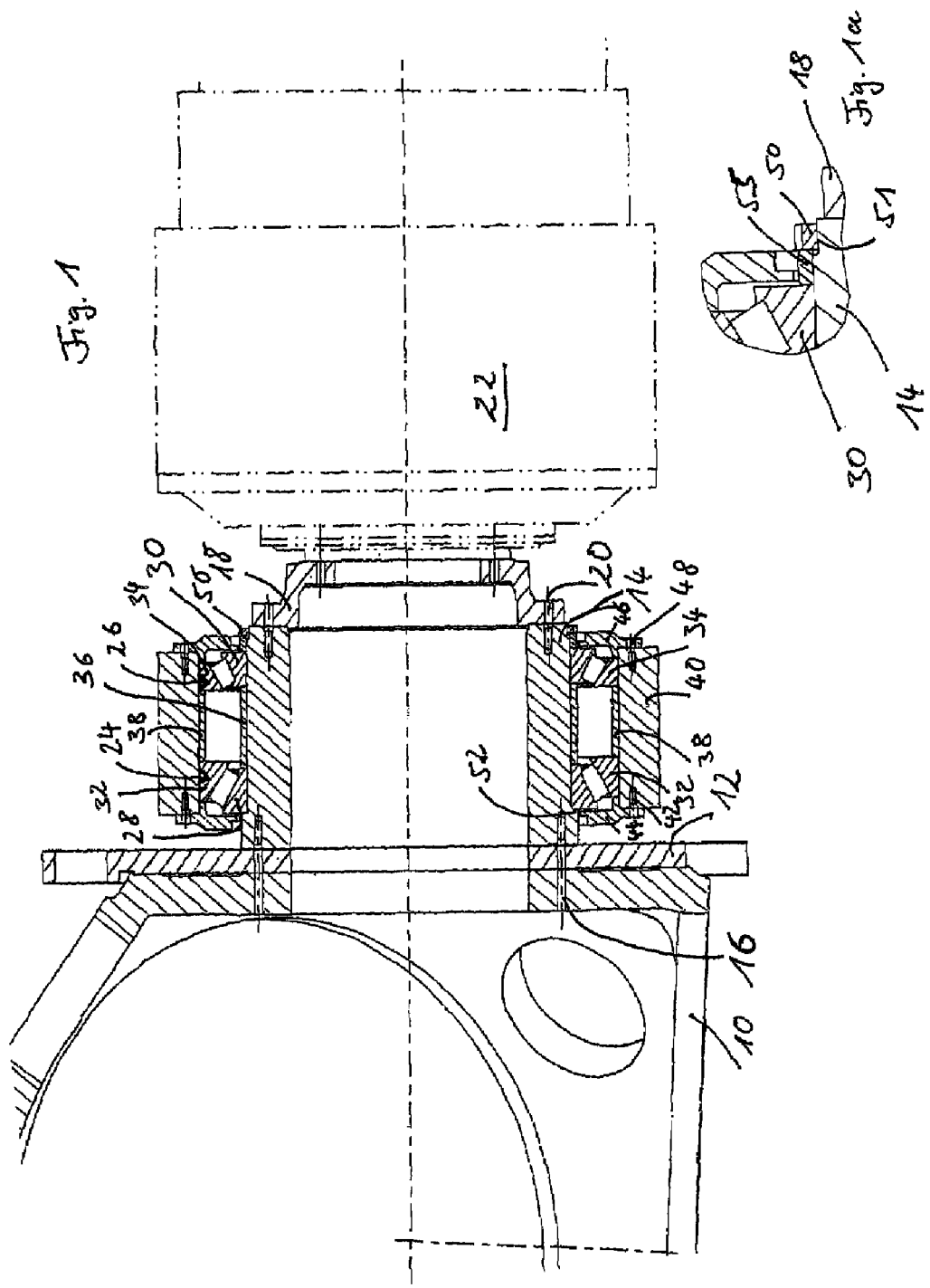

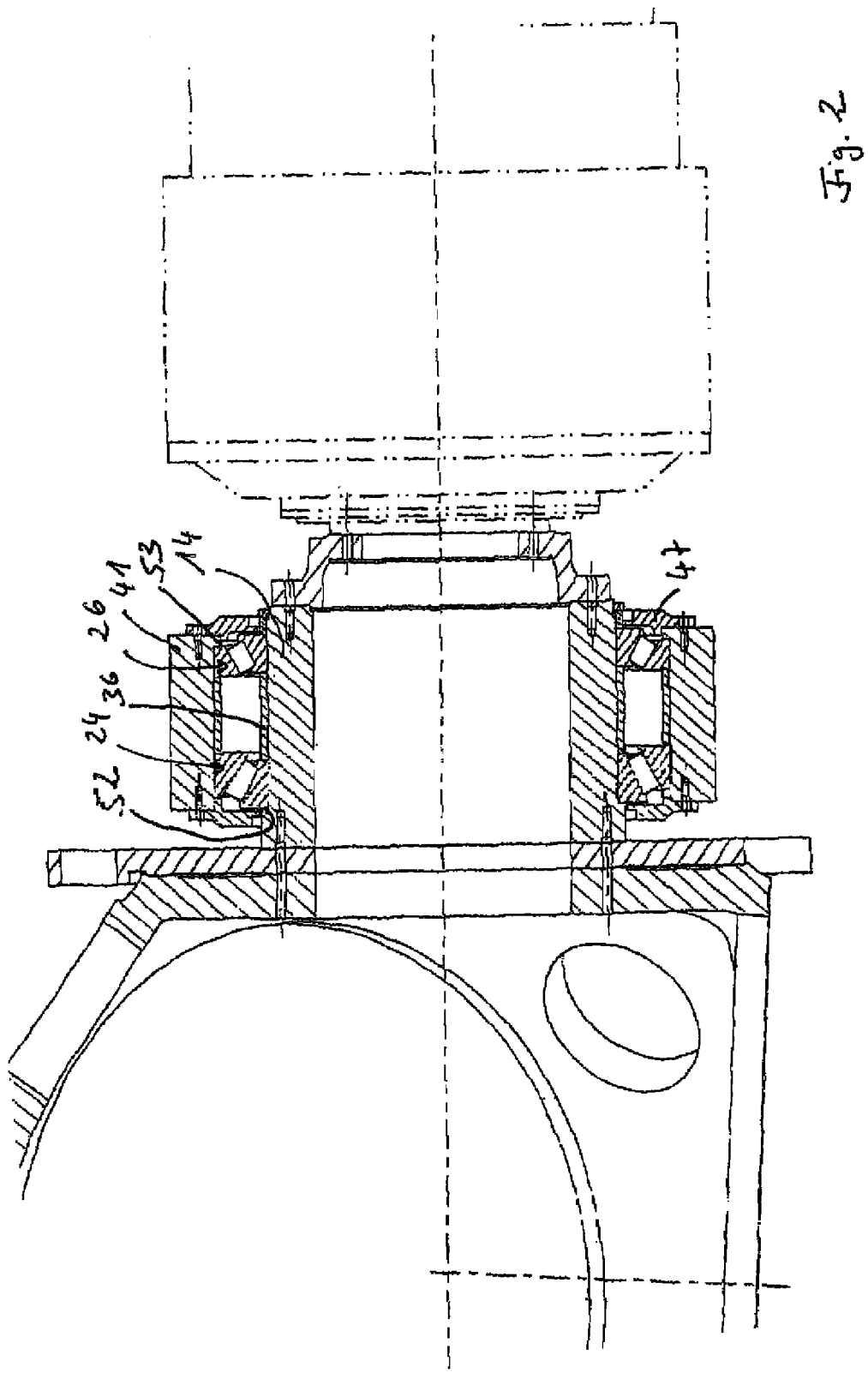

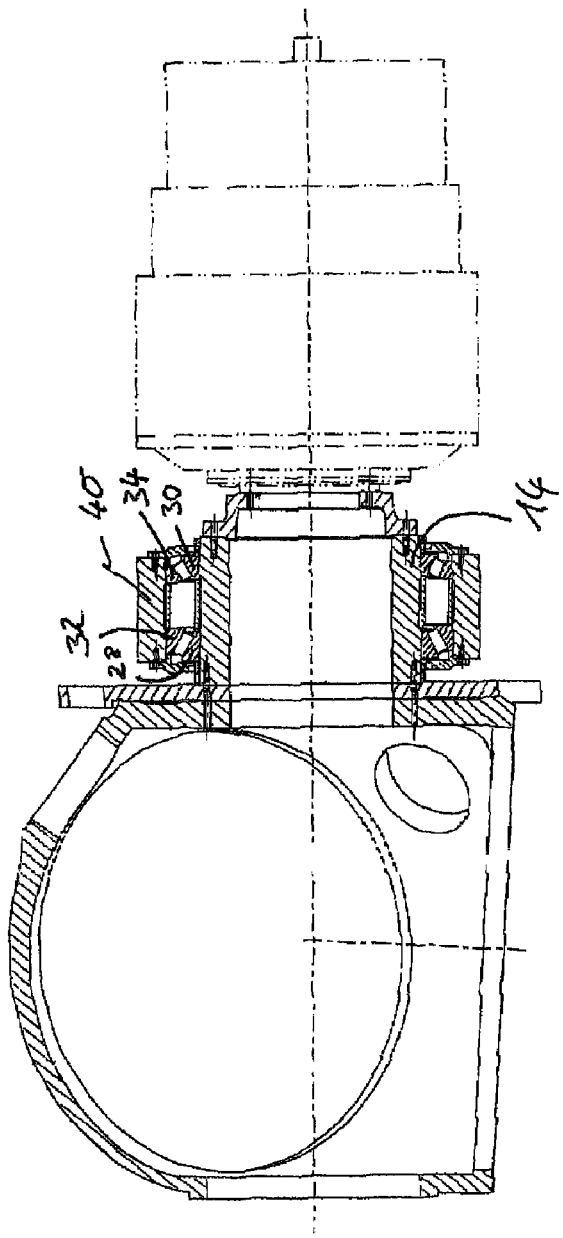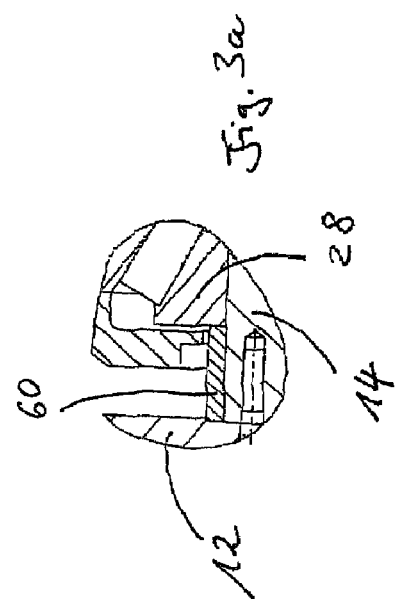

WIND ENERGY PLANT WITH A ROTOR

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a wind energy plant with a rotor, which is connected to a gearbox or a generator via a rotor shaft. The rotor shaft is bearing mounted on a carrier unit of the wind energy plant via two taper roller bearings in O arrangement, preferably via a bearing case. Each of the taper roller bearings has an inner race and an outer race.

From DE 103 51 524, the entire contents of which is incorporated herein by reference, a rotor bearing for a wind energy plant is known. The rotor bearing serves for the transmission of bending and torsional moments of the rotor, wherein two taper roller bearings with case-fixed outer race and a downstream planetary gearbox are provided. The depicted taper roller bearings are realised as a pair of taper roller bearings, which has an outer race formed in one piece. The rolling bodies of the pair of taper roller bearings are arranged such that the rolling body at the rotor side intersects the rotational axis of the rotor at the rotor side of the bearing arrangement with a normal direction standing vertical to its rotational axis, whereas the rolling body at the gearbox side intersects the rotational axis of the rotor at the gearbox side with its normal direction standing vertical to its rotational axis. Taper roller bearings arranged in this way with rotating inner race are designated as taper roller bearings in O arrangement in the special terminology of this field. The use of the taper roller bearings in O arrangement with an outer race formed in one piece permits a very compact construction of the rotor bearing.

From DE 103 92 908 B4, the entire contents of which is incorporated herein by reference, a wind energy plant with a taper roller bearing arrangement is known, in which the bearing arrangement has a first bearing ring splinedly fixed with respect to the rotor axis on a carrier unit, and a second bearing ring which is rotatable with respect to the rotor axis. The bearing has three rows of cylindrical bodies, wherein one row is arranged at the front side, and one row at a time on the sides of the inner race.

From WO 2006/000214 A1, the entire contents of which is incorporated herein by reference, a drive train bearing for a wind energy plant is known, in which a pair of taper roller bearings with divided inner race and an outer race formed in one piece is provided.

From WO 2006/072151 A1, the entire contents of which is incorporated herein by reference, a bearing arrangement for a pinion shaft in a gearbox is known. According to FIG. 2, a bearing arrangement for a pinion shaft is proposed which shows two taper roller bearings in O arrangement, wherein the pinion shaft is additionally bearing mounted in the gearbox case via a roller bearing with spiral springs.

From the document DOE/NASA/203 66-2, NASA TM-82721, the entire contents of which is incorporated herein by reference, with the title: "Experience and assessment of the DOE-NASA Mod-1 200 kilowatt wind energy turbine generator at Boone, N.C.", the bearing for a rotor shaft of a wind energy plant is known. FIG. 37 of this document shows a bearing for a rotor shaft of a wind energy plant with two taper roller bearings in O arrangement. In this, the outer race is formed in one piece.

The present invention is based on the objective to provide a wind energy plant with a bearing arrangement for the rotor shaft, which permits a good stability against bending moments and transverse forces at the one hand, and an adjustment of the bearing during the installation which is as simple as possible on the other hand.

BRIEF SUMMARY OF THE INVENTION

The wind energy plant of the present invention has a rotor, which is connected to a gearbox and a generator via a rotor shaft. The rotor shaft is directly or indirectly bearing mounted on a carrier unit in an O arrangement via two taper roller bearings. In the taper roller bearings realised according to the present invention, a separate inner race and a separate outer race is provided for each taper roller bearing at a time. According to the present invention, the inner races and the outer races of the taper roller bearings are secured in their distance to each other in the axial direction with respect to the rotational axis of the rotor shaft via an adjustment device. In difference to the solution known from the state of the art, two taper roller bearings are used in the solution of the present invention, each with separate inner race and separate outer race, which are in a distance from each other. The adjustment of the distance of the two taper roller bearings takes place in an axial direction, wherein the axial direction is related to the rotor shaft or its rotational axis, respectively. Through the adjustment device between the taper roller bearings, it is possible to space the same apart in a defined fashion, and thus to adjust the bearing prestress or the bearing internal clearance purposefully, through which there is a more uniform load of the bearing raceway. At the same time, the adjustment device permits to adjust the taper roller bearings to the desired dimension already in the manufacture via the adjustment device provided in the invention, before the installation on the rotor shaft. Through this, the installation on the rotor shaft is significantly simplified.

In a preferred embodiment, the adjustment device has two sleeves, from which a first one is arranged between the inner races, and a second one is arranged between the outer races of the taper roller bearings. The adjustment device with two sleeves makes sure that the distance necessary for the bearing via the taper roller bearings is guaranteed, between the inner races as well as between the outer races. In this, it is possible that the first sleeve has a length which is different from that of the second sleeve.

In a practical embodiment, the rotor shaft has means for fixing one or both taper roller bearings on the rotor shaft. As means for fixing, a shoulder can be provided on the shaft for instance, which serves as an abutting piece for the inner race of the rotor side taper roller bearing, for instance. In this, the inner race of the rotor side taper roller bearing bears against the shoulder on the rotor shaft at its side pointing to the rotor. Through this, the position of the rotor side taper roller bearing is defined at the rotor side. It is also possible to provide a spacer sleeve on the rotor shaft as a means for fixing, which is then in turn fixed on the rotor side again.

In a preferred embodiment, the outer races of the taper roller bearings are connected with the carrier unit via a bearing case. The bearing case is formed in one piece and encloses the outer races of the taper roller bearings.

In a preferred embodiment, one bearing cover (44, 46; 47) is provided at a time at the rotor side and/or at the gearbox side, which is connected to the bearing case, preferably screwed together with it.

The bearing case has suitably a shoulder at the rotor side or at the gearbox side, against which the outer race of the gearbox side taper roller bearing bears at its side pointing to the gearbox, and the outer race of the rotor side taper roller bearing bears at its side pointing to the rotor, respectively. Like already the shoulder on the rotor shaft, the shoulder on the bearing case serves to secure the position of the outer race of the respective taper roller bearing on one side in the axial direction. Even the shoulder on the bearing case may alternatively be replaced by a spacer sleeve set into the bearing case, or by other means for fixing the outer race in the axial direction.

In a preferred embodiment, the inner race of the gearbox side taper roller bearing is fixed in the axial direction on its side pointing to the gearbox via a lock nut or another device for applying an axial prestress force. By screwing tight the lock nut, the inner race of the gearbox side taper roller bearing is positioned, and by doing so, the arrangement of the two taper roller bearings is adjusted in the axial direction as a whole.

In a preferred embodiment, the rotor shaft is screwed together with a gearbox flange at its gearbox side, for connecting the rotor shaft with an input shaft of the gearbox. Via the gearbox flange, the torque from the rotor is transmitted to the downstream gearbox via the rotor shaft.

In a further preferred embodiment of the bearing according to the present invention, at their sides facing each other, the outer races of the taper roller bearings each have a step and/or a groove for receiving a front side end of the second sleeve.

In a further suitable embodiment, at their sides facing each other, even the inner races of the taper roller bearings each have a step for receiving the first sleeve. Like the steps in the outer race, this permits to bring the sleeves into a defined position. By the steps in the outer races and in the inner races, respectively, of the taper roller bearings, there is a centring of the sleeves, so that the adjustment process as well as the installation of the bearings is simplified. Any damage of the bearing seats in the installation of the sleeves is avoided, because in this, the sleeves can obtain a smaller (greater) diameter than the bearing seats in the bearing case (on the rotor shaft).

In a further preferred embodiment, a rotor locking disc is arranged at the gearbox side of the rotor shaft, wherein at its gearbox side, the rotor locking disc bears indirectly or directly against the inner race of the gearbox side taper roller bearing. Preferably, the rotor locking disc has a bore for receiving a locking bolt which is integrated on the bearing case. The rotor can be fixed in a defined position via the rotor locking disc. Such a securing of the rotor is desirable for installation or maintenance works, for instance.

In a preferred extension, the rotor locking disc has means for fixing the bearing axially, wherein for instance, the same consist of a threaded bore in the rotor locking disc and a corresponding thrust bolt. The thrust bolt bears indirectly or directly through the threaded bolt against the inner race of the gearbox side taper roller bearing. Via the thrust bolt, a force is exerted on the inner race of the gearbox side taper roller bearing in the axial direction. In addition, the pair of taper roller bearings is adjusted via the thrust bolt.

In a further preferred embodiment, the locking disc serves simultaneously as a means for transmitting the torque from the rotor shaft to the gearbox.

BRIEF DESCRIPTION OF THE SEVERAL VIEWS OF THE DRAWINGS

Five embodiments of the rotor shaft bearing of the present invention for a wind energy plant are described in more detail by means of the figures.

FIG. 1 shows a cross section through the bearing of a rotor shaft according to the present invention, with a rotor side end stop on the rotor shaft, FIG. 1a shows a detail view of the lock nut with a shaft sleeve, FIG. 2 shows a cross section through a second bearing of the rotor shaft of a wind energy plant according to the present invention, with a rotor side end stop on the rotor shaft, and a gearbox side end stop on the bearing case, FIG. 3 shows a cross section through a third bearing of the rotor shaft of a wind energy plant according to the present invention, with a rotor side spacer sleeve on the rotor shaft, FIG. 3a shows a detail view of the rotor side spacer sleeve from FIG. 3.

DETAILED DESCRIPTION OF THE INVENTION

Figure 4:
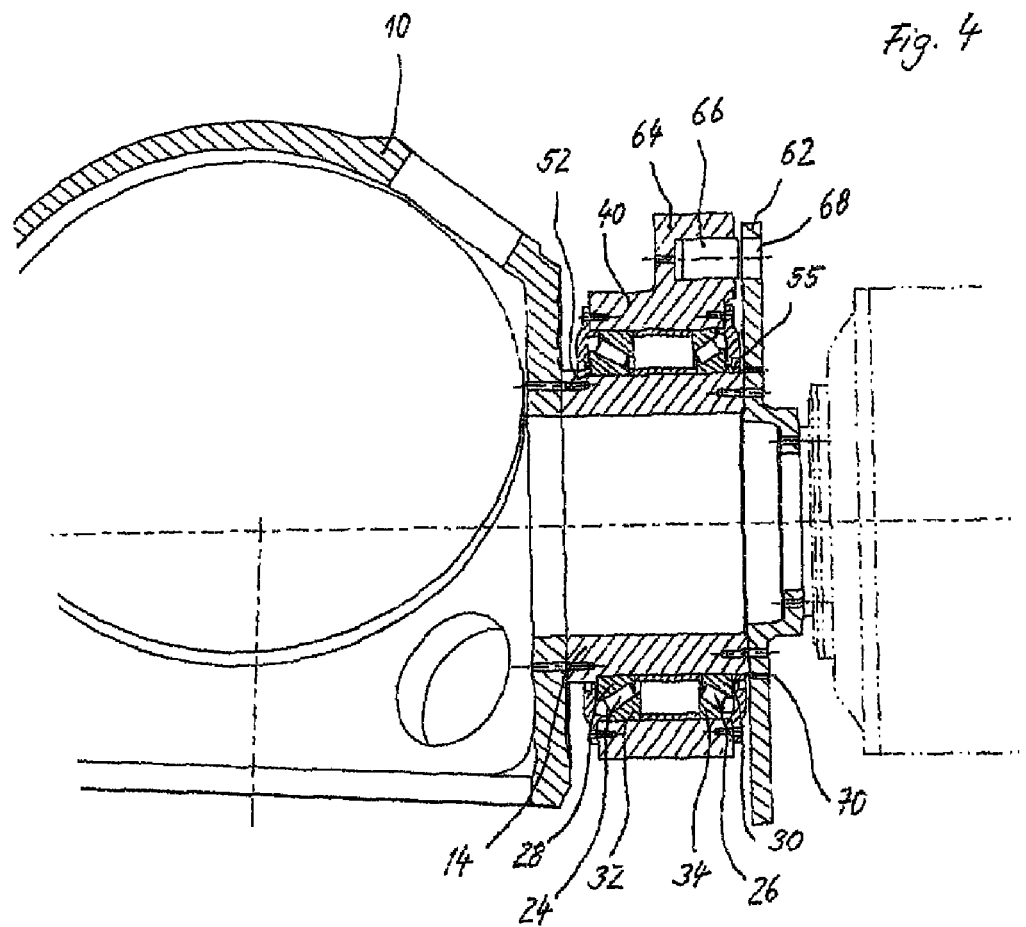
FIG. 4 shows a cross section of a fourth bearing of the rotor shaft of a wind energy plant according to the present invention, with a gearbox side locking disc on the rotor shaft.

While this invention may be embodied in many different forms, there are described in detail herein a specific preferred embodiment of the invention. This description is an exemplification of the principles of the invention and is not intended to limit the invention to the particular embodiment illustrated FIG. 1 shows a cut-out of a rotor hub 10, which is connected to a rotor shaft 14 via a locking disc 12, wherein the locking disc is clamped in between rotor shaft and rotor hub. The connection takes place via screws (not shown) in threaded bores 16, which extend at the rotor side through the rotor hub 10 and the locking disc 12 into the rotor shaft 14. On the opposing side of the rotor shaft 14, a gearbox flange 18 is also screwed up to the rotor shaft 14 at the front side via screws 20 (not shown). The gearbox flange 18 runs out into an input shaft of a gearbox 22. Of course, in wind energy plants which are realised without gearbox 22, the gearbox flange 18 can also run out directly into an input shaft or into the input connection of a generator (not shown).

Two taper roller bearings 24, 26 are arranged on the rotor shaft 20. In this, the taper roller bearing 24 is the taper roller bearing at the rotor side, wherein the taper roller bearing 26 is regarded as the taper roller bearing at the gearbox side. As depicted in FIG. 1, the inner races 28, 30 are each arranged offset in the axial direction of the rotor shaft with respect to the outer races 32, 34. In the realisation example depicted in FIG. 1, the inner race 28 of the rotor side taper roller bearing is offset in the direction towards the rotor with respect to the outer race 32. The inner race 30 of the gearbox side taper roller bearing 26 is offset towards the gearbox with respect to the outer race 34 of the gearbox side taper roller bearing.

A first sleeve 36 is inserted between the inner races 28 and 30 of the taper roller bearings 24 and 26. The first sleeve 36 bears against the rotor shaft 14, wherein the sleeve can bear against the rotor shaft completely or partly. The sleeve 36 defines the distance between the inner races 28 and 30. Between the outer races 32 and 34 is arranged a second sleeve 38. As can be recognised in FIG. 1, the sleeves 36 and 38 have different lengths, wherein the length difference between these sleeves is adjusted such that inner race and outer race occupy the defined position with respect to each other. In the production of the bearing arrangement, the sleeves 36 and 38 are accurately cut into length with a precision of about 1/100 mm.

The outer races 32, 34 are enclosed by a bearing case 40 (compare FIG. 1 at the downside). In the embodiment depicted in FIG. 1, the bearing case 40 has an inner surface, against which bear the outer sides of the outer races 32, 34. The second sleeve 38 can bear against the inner surface, or alternatively bear against the inner surface of the bearing case only in portions.

At the rotor side, an axial bore 42 is provided on the bearing case, into which a rotor side bearing cover 44 is screwed via a screw (not shown). At the gearbox side, the bearing case 40 is also provided with a bore 48, via which a bearing cover 46 is screwed together with the bearing case 40 (screws not shown). On their inner sides pointing to the taper roller bearings, the bearing lids 44, 46 each have a shoulder projecting in the axial direction, which bears against the outer races of the taper roller bearings.

A lock nut 50 on a threaded portion 51 provided at the end of the rotor shaft 14 at the gearbox side serves to prestress the bearing inner races and the first sleeve 36 definedly. The detail view from FIG. 1a shows the lock nut 50 from the upper portion of FIG. 1. In the terminology of the art, the process of applying a defined prestress force is designated as: to draw the inner races and the sleeve to blocking. As can be further seen in the detail view from FIG. 1a, a shaft sleeve 55 is provided between the lock nut 50 and the inner race 30 of the gearbox side taper roller bearing, which transmits the prestress force of the lock nut 50.

For better understanding of the functional principle of the sleeves 36 and 38, the process of the production is explained in a few words in the following.

In a first operation step, the rotor side taper roller bearing is positioned with the rotor side pointing downward. Thereafter, the outer sleeve 38 is set up. The gearbox side taper roller bearing is consecutively placed on the outer sleeve. For adjusting the bearing, the gearbox side bearing inner race is then loaded with a defined axial force, and the distance between the two bearing inner races is measured. Based on the measured distance, the inner sleeve 36 is produced, with the required oversize for the adjustment with bearing internal clearance, or with undersize for the adjustment with prestress. Through the accurate manufacture of the inner sleeve, the taper roller bearings are adjusted with respect to each after applying an axial force.

In the bearing installation with the sleeves 36, 38, there is a vertical positioning of the rotor shaft at first, onto which the bearing inner race with the set of rolling bodies of the rotor side bearing is thrust up. In the following, the sleeve 36 is set in. Thereafter there is the vertical positioning of the bearing case, and the outer race of the rotor side bearing is thrust in. The outer sleeve 38 is set in, and the bearing outer race of the gearbox side bearing is thrust in. Thereafter, the bearing case is set on the rotor shaft, and the gearbox side bearing inner race, including the set of rolling bodies, is thrust up on the rotor shaft. In the following, the gearbox side shaft sleeve is set up, and the bearing unit is adjusted by definedly screwing tight the lock nut, or by applying a defined prestress force via an adjustment device, respectively. Finally, the installation of the bearing covers provided at the end sides takes place.

In FIG. 1, the rotor shaft 14 has a shoulder 52 at its end pointing to the rotor 10, against which the inner race 28 of the rotor side taper roller bearing 24 bears at the gearbox side. Through the shoulder 52 on the rotor shaft 14, in co-operation with the first sleeve 36, the shaft sleeve 55 and the lock nut 50, the position of the inner races 28 and 30 on the rotor shaft 14 is secured.

FIG. 2 shows an alternative embodiment of the bearing. In the following, same assembly parts are provided with the same reference numerals. In the taper roller bearings 24 and 26 on the rotor shaft 14, again the inner race of the rotor side taper roller bearing 24 bears against a shoulder 52 of the rotor shaft 14 at the gearbox side. In difference to the embodiment from FIG. 1, the bearing case 41 has a shoulder 53 at the gearbox side, against which the outer race of the gearbox side taper roller bearing 26 bears at the rotor side. In this way, the position of the outer race of the gearbox side bearing is secured furthermore. A further difference with respect to the embodiment of FIG. 1 is that the gearbox side bearing cover 47 does not bear against the outer race 34, but is spaced apart from the same in the axial direction. Even in the arrangement of the two taper roller bearings 24 and 26 depicted in FIG. 2, the position thereof with respect to each other can be adjusted before the installation on the rotor shaft 14, by matching the sleeves 36 and 38 accurately with each other before, so that the inner races and the outer races have the envisioned distance from each other.

FIG. 3 shows a further embodiment of the rotor bearing of the present invention. In this embodiment, assembly parts which are the same as those in earlier embodiments are provided with the same reference numerals again. In difference to the embodiment of FIG. 2, the bearing case 40 in the third embodiment has no shoulder at the rotor side end. Instead, the inner races 34 and 32 of the taper roller bearings bear against a portion of the inner surface of the bearing case 40. In this, the region of the inner surface of the bearing case between the outer races 32 and 34 can have a deepening, as well as the region on the rotor shaft 14 between the inner races 28, 30. A particular feature of the embodiment according to FIG. 3 is depicted in FIG. 3a. Here, a spacer sleeve 60 is set up on the rotor shaft 14. At the rotor side, the spacer sleeve 60 can be axially fixed in the rotor side direction by the locking disc 12, directly by the rotor hub or by another circumferential assembly part. At the gearbox side, the spacer sleeve 60 support the inner race 28 of the rotor side taper roller bearing. Thus, the spacer sleeve 60 fulfils the same task as does the shoulder 52 according to the embodiments of FIGS. 1 and 2, and in addition it avoids that the rotor shaft 14 gets a greater diameter in the form of a shaft shoulder, and a jump discontinuity in stiffness through this.

Figure 4A:
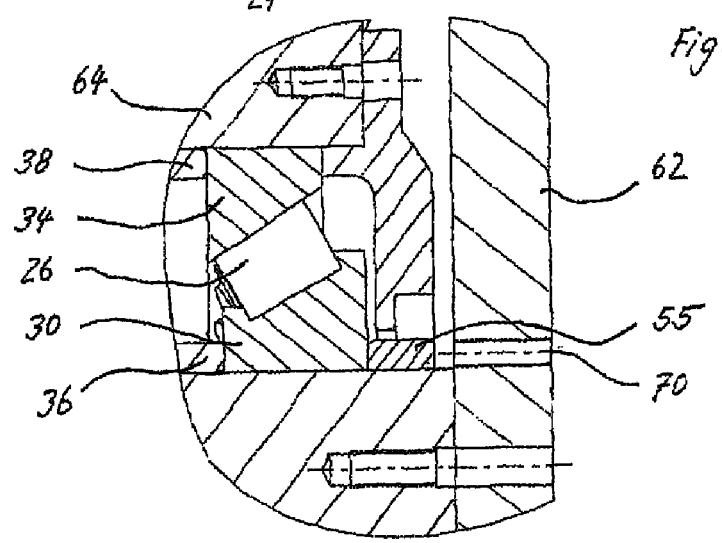
FIG. 4a shows a detail view of the locking disc from FIG. 4.

FIGS. 4 and 4a show a further example of the realisation of the bearing of the present invention, in which same assembly parts are again provided with the same reference numerals. The taper roller bearings 24 and 26 are arranged at the rotor side and at the gearbox side end, respectively, of the rotor shaft 14. The rotor side taper roller bearing 24 bears against a shaft shoulder 52 with its inner race 28 at the rotor side. The gearbox side taper roller bearing 26 bears against a shaft sleeve 55 with its inner race 30 at the gearbox side. The sleeve 36 is situated between the inner races 30 and 28 of the taper roller bearings.

The outer races 32 and 34 of the taper roller bearings are arranged inside the bearing case 40. Between the outer races 32 and 34 is arranged the sleeve 38, which also bears against the bearing case 40. A rotor locking unit 64 is provided on the bearing case 40, which has a locking bolt 66, via which the rotor shaft and the rotor can be secured with respect to the rotor locking disc 62. For this purpose, the bolt 66 is pushed forward, so that it engages in a bore 68 in the rotor locking disc 62.

The rotor locking disc 62 has a threaded bore 70, through which a thrust bolt (not shown) can be screwed in, in order to apply a defined force on the inner race 30 of the gearbox side taper roller bearing 26 and to fix the same in its axial position at the same time.

Figure 5:
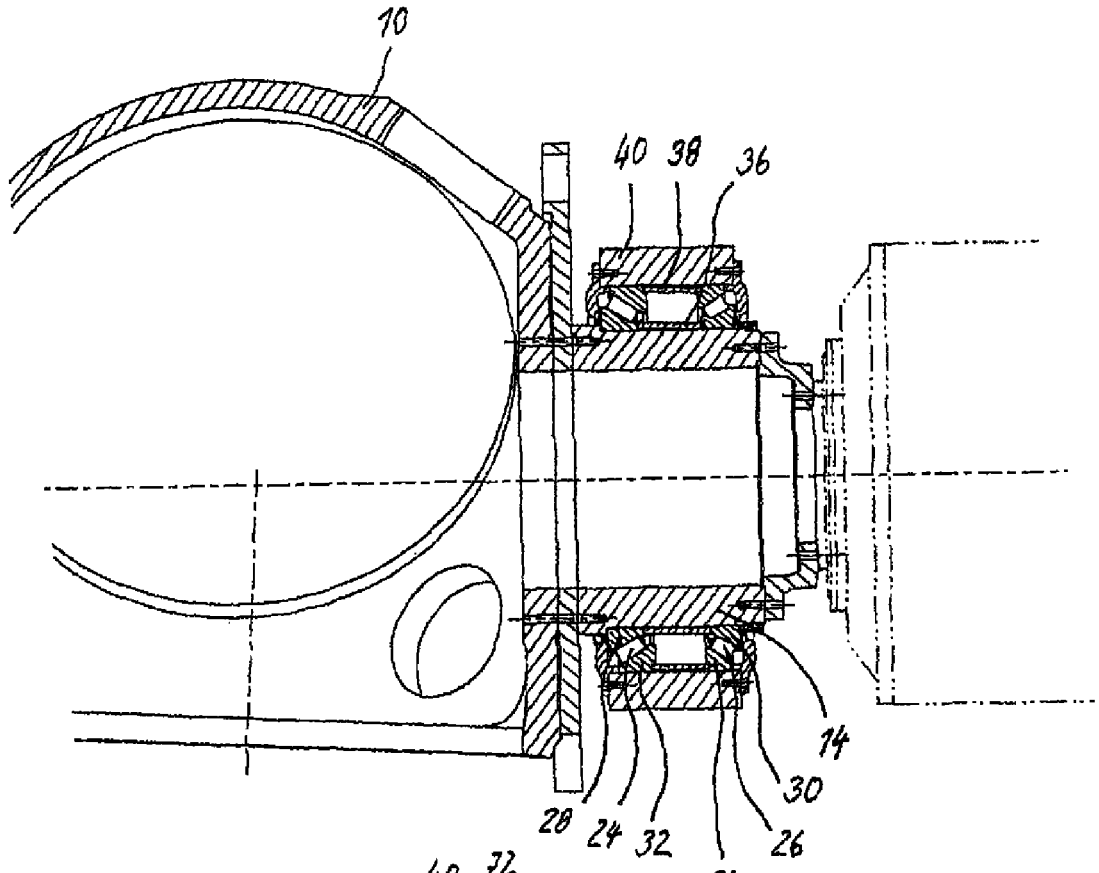
FIG. 5 shows a cross section of a fifth bearing of the rotor shaft of a wind energy plant according to the present invention, in which inner race and outer race are provided with a step for receiving the inner and the outer sleeve.

The FIGS. 5 and 6 show a further realisation example of the bearing of the present invention, in which the inner sides of the outer races 32 and 34 are each at a time provided with a step 72. The second sleeve 38 bears against the respective steps 72 between the outer races 32 and 34. In the same way, the inner races 28, 30 of the taper roller bearings are provided with steps 74, against which bears the first sleeve 36.

Figure 5A:
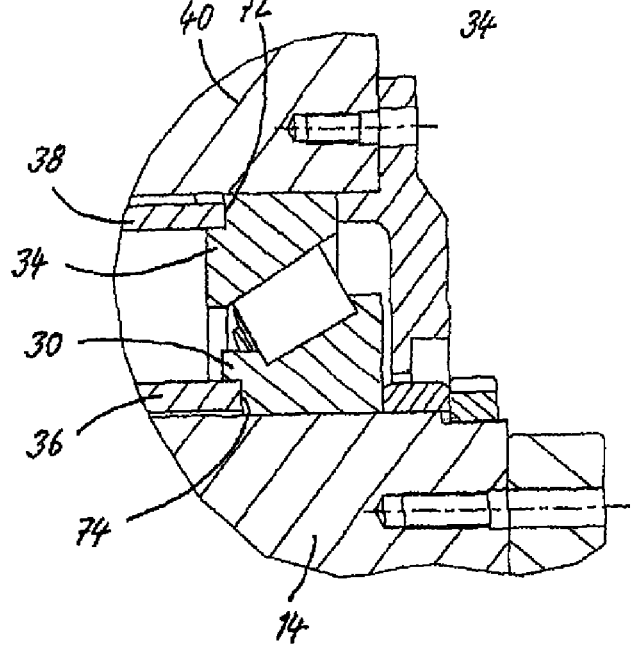
FIG. 5a shows a detail view of the gearbox side taper roller bearing from FIG. 5.

Alternatively to the steps 72 and 74 of the inner and outer races, which are situated inside with respect to the pair of bearings and depicted in FIGS. 5 and 5a, the steps 72, 74 can also enclose the sleeves 36, 38 at the outside with respect to the pair of bearings, or else wise formed recesses for receiving the sleeves 36 and 38 can be provided, when the same are adapted to the geometry of the sleeves.

In the adjustment of the taper roller bearings, a centring of the sleeves 36, 38 takes place through the steps 72, 74, which significantly simplifies the installation.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A wind energy plant with a rotor, which is connected to a gearbox (22) and/or a generator via a rotor shaft (14), wherein the rotor shaft (14) is bearing mounted on a carrier unit via two taper roller bearings (24, 26) in an O arrangement, wherein each taper roller bearing (24, 26) has an inner and an outer race, wherein the inner races (28, 30) and the outer races (32, 34) are secured in their distance to each other in the axial direction with respect to the rotational axis of the rotor shaft (14) via an adjustment device (36, 38).

2. The wind energy plant according to claim 1, wherein the adjustment device has at least two sleeves (36, 38), from which the first sleeve (36) is arranged between the inner races (28, 30), and a second sleeve (38) is arranged between the outer races (32, 34) of the taper roller bearings (24, 26).

3. The wind energy plant according to claim 1, wherein means for fixing one or both taper roller bearings are provided on the rotor shaft.

4. The wind energy plant according to claim 3, wherein the rotor shaft (14) has a shoulder (42) as the means for fixing, against which the inner race (28) of the rotor side taper roller bearing (24) bears at its side pointing towards the rotor.

5. The wind energy plant according to claim 3, wherein a spacer sleeve (60) is provided on the rotor shaft as the means for fixing.

6. The wind energy plant according to claim 1, wherein the outer races (32, 34) of the taper roller bearings (24, 26) are connected to the carrier unit via a bearing case (40; 41).

7. The wind energy plant according to claim 6, wherein a bearing cover (44, 46; 47) is provided at the rotor side and/or at the gearbox side, which is connected to the bearing case (40; 41).

8. The wind energy plant according to claim 1, wherein a bearing case has a shoulder (53) at the rotor side or at the gearbox side, against which the outer race (34) of the gearbox side taper roller bearing (26) bears at its side pointing to the gearbox, and the outer race (32) of the rotor side taper roller bearing (24) bears at its side pointing to the rotor, respectively.

9. The wind energy plant according to claim 1, wherein the inner race (30) of the gearbox side taper roller bearing is secured in the axial direction on its side pointing to the gearbox via means for applying an axial prestress force.

10. The wind energy plant according to claim 9, wherein a lock nut (50) is provided as the means for applying an axial prestress force.

11. The wind energy plant according to claim 10, wherein the lock nut (50) is screwed up on a threaded portion (51) on the gearbox side end of the rotor shaft.

12. A wind energy plant with a rotor which is connected to a gearbox (22) and/or a generator via a rotor shaft (14), wherein the rotor shaft (14) is bearing mounted on a carrier unit via two taper roller bearings (24, 26) in an O arrangement, wherein each taper roller bearing (24, 26) has an inner and an outer race, wherein the inner races (28, 30) and the outer races (32, 34) are secured in their distance to each other in the axial direction with respect to the rotational axis of the rotor shaft (14) via an adjustment device (36, 38),
    wherein the inner race (30) of the gearbox side taper roller bearing is secured in the axial direction on its side pointing to the gearbox via a lock nut (50) for applying an axial prestress force, and
    wherein a shaft sleeve (55) is provided between the gearbox side inner race (30) and the lock nut (50).

13. The wind energy plant according to claim 1, wherein the rotor shaft (14) has a gearbox flange (18) at its gearbox side, for connecting the rotor shaft with an input shaft of the gearbox (22).

14. A wind energy plant with a rotor which is connected to a gearbox (22) and/or a generator via a rotor shaft (14), wherein the rotor shaft (14) is bearing mounted on a carrier unit via two taper roller bearings (24, 26) in an O arrangement, wherein each taper roller bearing (24, 26) has an inner and an outer race, wherein the inner races (28, 30) and the outer races (32, 34) are secured in their distance to each other in the axial direction with respect to the rotational axis of the rotor shaft (14) via an adjustment device (36, 38), which has at least two sleeves (36, 38), from which the first sleeve (36) is arranged between the inner races (28, 30) and the second sleeve (38) is arranged between the outer races (32, 34) of the taper roller bearings (24, 26), and wherein at their sides facing each other, the outer races (32, 34) each have a step (72) for receiving a front side end of the second sleeve (38).

15. A wind energy plant with a rotor which is connected to a gearbox (22) and/or a generator via a rotor shaft (14), wherein the rotor shaft (14) is bearing mounted on a carrier unit via two taper roller bearings (24, 26) in an O arrangement, wherein each taper roller bearing (24, 26) has an inner and an outer race, wherein the inner races (28, 30) and the outer races (32, 34) are secured in their distance to each other in the axial direction with respect to the rotational axis of the rotor shaft (14) via an adjustment device (36, 38), which has at least two sleeves (36, 38), from which the first sleeve (36) is arranged between the inner races (28, 30) and the second sleeve (38) is arranged between the outer races (32, 34) of the taper roller bearings (24, 26), and wherein at their sides facing each other, the inner races (28, 30) each have a step (74) for receiving the first sleeve (36).

16. The wind energy plant according to claim 1, wherein a rotor locking disc (62) is arranged at the gearbox side of the rotor shaft (14), wherein at its gearbox side, the rotor locking disc (62) bears indirectly or directly against the inner race (30) of the gearbox side taper roller bearing (26).

17. A wind energy plant with a rotor which is connected to a gearbox (22) and/or a generator via a rotor shaft (14), wherein the rotor shaft (14) is bearing mounted on a carrier unit via two taper roller bearings (24, 26) in an O arrangement, wherein each taper roller bearing (24, 26) has an inner and an outer race, wherein the inner races (28, 30) and the outer races (32, 34) are secured in their distance to each other in the axial direction with respect to the rotational axis of the rotor shaft (14) via an adjustment device (36, 38), wherein the outer races (32, 34) of the taper roller bearings (24, 26) are connected to the carrier unit via a bearing case (40, 41), wherein a rotor locking disc (62) has a bore (68) for receiving a locking bolt which is integrated on the bearing case.

18. The wind energy plant according to claim 16, wherein the rotor locking disc (62) is connected to an input shaft of the gearbox.

19. The wind energy plant according to claim 16, wherein the rotor locking disc (62) has means for fixing the bearing axially.

20. A wind energy plant with a rotor which is connected to a gearbox (22) and/or a generator via a rotor shaft (14), wherein the rotor shaft (14) is bearing mounted on a carrier unit via two taper roller bearings (24, 26) in an O arrangement, wherein each taper roller bearing (24, 26) has an inner and an outer race, wherein the inner races (28, 30) and the outer races (32, 34) are secured in their distance to each other in the axial direction with respect to the rotational axis of the rotor shaft (14) via an adjustment device (36, 38), wherein a rotor locking disc (62) is arranged at the gearbox side of the rotor shaft (14), wherein at its gearbox side, the rotor locking disc (62) bears indirectly or directly against the inner race (30) of the gearbox side taper roller bearing (26), wherein the rotor locking disc (62) has means for fixing the bearing axially, wherein the means for fixing the bearing axially have a threaded bore (70) in the rotor locking disc (62) and a corresponding thrust bolt, which bears indirectly or directly through the threaded bore (70) against the inner race (30) of the gearbox side taper roller bearing (26).

* * * * *